2,989,524
PROCESS FOR THE MANUFACTURE OF EPOXY STEROIDS

Eugene P. Oliveto, Glen Ridge, N.J., assignor to Schering Corporation, Bloomfield, N.J., a corporation of New Jersey
No Drawing. Filed Mar. 13, 1959, Ser. No. 799,095
10 Claims. (Cl. 260—239.55)

This invention relates to a novel process for producing valuable steroid compounds. More particularly, this invention relates to a novel method for converting a 9α-halogeno-11β-acyloxy intermediate to a 9β,11β-oxido analog.

The value of 9β,11β-oxido steroids is well known in the art. By reacting same with a hydrogen halide there is produced a 9α-halo-11β-hydroxy system which is of great importance in the field of therapeutics. Among the many uses are conversion to potent therapeutic agents such as 9α-fluorohydrocortisone, 9α-fluoroprednisolone, dexamethasone and the like. In the androstane series the 9β,11β-oxido group is similarly transformable to provide for compounds such as 9α-fluoro-11β-hydroxy-17-methyl-testosterone and a host of other therapuetically active substances.

Heretofore, 9,11-oxido steroids of the pregnane and androstane series have been prepared by treating the Δ$^{9(11)}$-analog with hypobromous acid (or its chemical equivalent) thus forming a bromohydrin. The bromohydrin upon treatment with a base undergoes elimination of the elements of hydrogen bromide and thus forms an epoxide ring.

In the copending application of Finckenor et al., Serial No. 799,096, filed March 13, 1959, is described and claimed novel 9α-halogeno-11β-acylates together with processes for their manufacture. I have found an advantageous manner of converting these halogeno acylates to 9β,11β-epoxides by chemical means. It is generally known that in the pregnane series, specifically corticoids containing a dihydroxy acetone side chain, saponification of 11β-esters in general is difficult. The 11β-hydroxy group is in a hindered position and when esterified with simple fatty acids, such as acetic, strong alkali is necessary to effect even slight saponification. Under such circumstances, degradation of the side chain occurs under such basic conditions.

I have found, however, that if the 11β-ester is formed from a particular group of acids such as formic, trifluoracetic, dichloroacetic, and the like, saponification occurs readily with concomitant ring closure so as to form the 9β,11β-epoxide. In the case of 9α-halogeno-11β-acylates having a labile side chain, proper protective measures can be taken to prevent secondary reaction. For example, in a 17α,21-dihydroxy-20-keto-starting material, the side chain is effectively protected against strong alkali by the formation of a bis-methylenedioxy derivative. This derivative, as described in the art, is prepared by treating a 17α,21-dihydroxy-20-keto steroid with formaldehyde in the presence of an acid catalyst. Under basis conditions whereby the 9α-halogeno-11β-acylate is saponified and forms a 9β,11β-oxido group, the bis-methylenedioxy function is inert. The 17α,21-dihydroxy-20-keto side chain may be reconverted by hydrolyzing the bismethylene dioxy group with acid.

In essence, my process is the single step process of treating a 9α-halogeno-11β-acyloxy steroid with base whereby there is formed a 9β,11β-oxido analog. The specific conditions for the reaction are determined by the structure of the 11-esterifying acid and of the steroid itself. Mild alkaline conditions are effective with easily hydrolyzable groups such as formate, trifluoroacetate, dichloroacetate, and sulfonates such as tosylate, mesylate and the like. Strong alkaline conditions are necessary for esters such as acetate, benzoate and the like. It will be apparent to one skilled in the art as to the general reaction conditions to apply.

It is apparent that in the androstane series, the use of strong alkali is generally not detrimental, since alkali sensitive groups are generally absent. For example, 9α-bromo-11β-acetoxy-17-methyl-testosterone is readily converted to 9β,11β-oxido-17-methyl-testosterone by means of strong alkali.

As indicated in the copending application of Finckenor et al., supra, the 9α-halogeno-11β-acyloxy steroids are preparable in very high yield, generally exceeding 90%. My method provides a conversion of these valuable compounds in one step to a 9β,11β-oxido cyclopentanoperhydrophenanthrene.

The following examples are illustrative of my novel process. Those examples describing the preparation of the 9α-halogeno-11β-esters are taken from the copending application of Finckenor et al., supra, and are hereby disclaimed.

EXAMPLE 1

*9α-bromo-1,4-pregnadiene-11β,17α,21-triol-3,20-dione-11β-formate 21-acetate*

To a stirred solution of 1.0 g. of 1,4,9(11)-pregnatriene-17α,21-diol-3,20-dione 21-acetate in 40 ml. of formic acid containing 4.0 g. of sodium formate is added 395 mg. N-bromoacetamide. Stirring is continued for 3 hours, and the reaction mixture is then poured into 400 ml. of water, filtered and the residue washed with water and dried. The dried residue weighs 1.26 g. and consists of 9α-bromo-1,4-pregnadiene - 11β,17α,21 - triol-3,20-dione-11β-formate 21-acetate. Purification is effected by crystallization from acetone-hexane, M.P. 210–213° C. dec.

$\lambda_{max}^{MeOH}$ 239 mμ (ε 13,800)

*Analysis.*—Calcd. for $C_{24}H_{29}O_7Br$: C, 56.58; H, 5.74; Br, 15.69. Found: C, 56.27; H, 5.68; Br, 14.12.

EXAMPLE 2

*9α-bromo-1,4-pregnadiene-11β,17α,21-triol-3,20-dione-11β-trifluoracetate 21-acetate*

To a stirred solution of 1.0 g. of 1,4,9(11)-pregnatriene-17α,21-diol-3,20-dione 21-acetate in 20 ml. of tetrahydrofuran and 20 ml. of trifluoracetic acid is added 400 mg. N-bromoacetamide, the temperature being maintained at about 25° C. by cooling. Stirring at room temperature is continued for 3 hours, and the reaction mixture is then poured into 400 ml. of water and filtered. The residue is washed with water and dried, giving 9α-bromo-1,4-pregnadiene - 11β,17α,21 - triol - 3,20-dione-11β-trifluoracetate 21-acetate (1.35 g., 90%). Purification is effected by crystallization from acetone-hexane, M.P. 205–210° dec.

$\lambda_{max}^{MeOH}$ 240 mμ (ε 13,900)

*Analysis.*—Calcd. $C_{25}H_{28}O_7BrF_3$: C, 52.00; H, 4.89; Br, 13.84. Found: C, 52.20; H, 4.89; Br, 13.76.

EXAMPLE 3

*9α-chloro-1,4-pregnadiene-11β,17α,21-triol-3,20-dione-11β-formate 21-acetate*

To a stirred solution of 1.0 g. 1,4,9(11)-pregnatriene-17α,21-diol-3,20-dione 21-acetate in 40 ml. formic acid containing 4.0 g. sodium formate is added 382 mg. N-chlorosuccinimide followed immediately by 2.7 ml. of 1 N-hydrochloric acid. Stirring is continued for 3 hours at room temperature, and the reaction mixture is then poured into water (400 ml.). Filtration, followed by water-washing and drying of the residue gives 1.14 g. of 9α-chloro-1,4-pregnadiene-11β,17α,21-triol-3,20-dione-11β-formate 21-acetate. This compound, after crystallization from acetone-hexane, has M.P. 258–262° C. dec.

$$\lambda_{max}^{MeOH}\ 237\ m\mu\ (\epsilon\ 14,500)$$

*Analysis*—Calcd. for $C_{24}H_{29}O_7Cl$: C, 61.99; H, 6.28; Cl, 7.64. Found: C, 61.64; H, 6.58; Cl, 7.36.

EXAMPLE 4

*9α-bromo-4-pregnene-11β,17α,21-triol-3,20-dione-11β-formate 21-acetate*

To a stirred solution of 1.0 g. of 4,9(11)-pregnadiene-17α,21-diol-3,20-dione 21-acetate in 40 ml. of formic acid containing 4 g. potassium formate is added 395 mg. N-bromoacetamide. Stirring is continued for 3 hours, the reaction mixture was poured into 400 ml. water and filtered. The residue is washed and dried yielding 1.24 g. of 9α-bromo-4-pregnene-11β,17α,21-triol-3,20-dione-11β-formate 21-acetate $$\lambda_{max}^{MeOH}\ 239\ m\mu\ (\epsilon\ 14,000)$$

EXAMPLE 5

*9α-bromo-4-pregnene-11β,17α,21-triol-3,20-dione-11β trifluoracetate 21-acetate*

The 11β-trifluoracetate of this example is prepared from 4,9(11) - pregnadiene - 17α,21 - diol-3,20 - dione 21-acetate exactly as described for Example 2. The yield of 9α-bromo-4-pregnene-11β,17α,21-triol-3,20-dione-11β-trifluoracetate 21-acetate, which exhibited $$\lambda_{max}^{MeOH}\ 240\ m\mu\ (\epsilon\ 13,800)$$

is 92%.

EXAMPLE 6

*9α-bromo-4-pregnene-11β-ol-3,20-dione-11-trifluoracetate*

To a stirred solution of 1.0 g. of 4,9(11)-pregnadiene-3,20-dione in 25 ml. of tetrahydrofuran and 25 ml. of trifluoracetic acid is added N-bromoacetamide (450 mg.), the temperature being maintained at about 25° C. by cooling. Stirring at room temperature is continued for 3 hours, and the reaction mixture is poured into 500 ml. water and filtered. The residue is washed with water and dried, giving 1.47 g. 9α-bromo-4-pregnene-11β-ol-3,20-dione-11β-trifluoracetate, $$\lambda max.\ 240\ m\mu\ (\epsilon\ 14,100)$$

EXAMPLE 7

*9β-11β-oxido-1,4-pregnadiene-17α,21-diol-3,20-dione*

(A) From the compound of example 1, the 11β-formate (570 mg.) is suspended in methanol (35 ml.) and to this suspension is added, dropwise with stirring, 2.85 ml. of 1 N-aqueous sodium hydroxide solution. Stirring is continued for 16 hours at room temperature, and the reaction mixture is then poured into 400 ml. water. The mixture is extracted with methylene chloride which upon evaporation yields the crude 9β,11β-oxido-21-ol (350 mg.). The substance is acetylated at C-21 in pyridine and acetic anhydride for 1½ hours, the acetylated product being isolated by water precipitation and filtration. The water-washed and dried residue weighing 350 mg. is crystallized from acetone-hexane to yield pure 9β,11β-oxido 21-acetate of this example identical with authentic material as evidenced by melting point, mixed melting point, comparison of infrared spectra and paper chromatography.

(B) The compound of Example 2 is dissolved in 100 ml. absolute ethanol containing 4 g. potassium acetate and the solution is refluxed for 17 hours. The reaction mixture is concentrated to about 20 ml., water is added, and the mixture is extracted with methylene chloride. The extracts are washed with water, dried with magnesium sulfate, filtered and evaporated in vacuo to yield the crude product (750 mg.). This material, on paper chromatography using a propylene glycol toluene-dioxane system, shows corresponding to about 80% of the 9β,11β-oxido 21-acetate and about 20% of the corresponding 21-alcohol. Reacetylation at C-21, using pyridine-acetic anhydride at room temperature, gives 750 mg. of product, which after filtration through Florisil in methylene chloride-ether (1:9) gives pure the 9β,11β-oxido 21-acetate of this example, identical with authentic material (melting point, mixed melting point and comparison of infrared spectra).

EXAMPLE 8

*9β,11β-oxido-4-pregnene-17α,21-diol-3,20-dione 21-acetate*

From the compound of Example 5, a solution of 1.0 g. 9α - bromo - 4-pregnene - 11β,17α,21-triol-3,20-dione-11β-trifluoracetate 21-acetate in 20 ml. absolute ethanol (70 ml.) containing potassium acetate (3 g.) is refluxed for 17 hours. The reaction mixture is concentrated in vacuo and water is added, the mixture then being extracted with methylene chloride. The extracts are washed with water, dried over magnesium sulfate and evaporated in vacuo to yield 520 mg. crude product (75%). This material is reacetylated at C-21 in pyridine-acetate anhydride at room temperature, and the reacetylated material is crystallized from acetone-hexane to yield pure 9β,11β-oxido-4-pregnene-17α,21-diol-3,20-dione 21-acetate identical with an authentic sample as demonstrated by melting point, mixed melting point and comparison of infrared spectra.

EXAMPLE 9

*9β,11β-oxido-4-pregnene-3,20-dione*

The 11β-trifluoracetate (from Example 6; 1.0 g.) is suspended in methanol (80 ml.) and to this suspension is added, dropwise with stirring, N-aqueous sodium hydroxide solution (4.0 ml.) at room temperature. Stirring is continued for 16 hours at room temperature, and the reaction mixture is poured into water (1 liter). The steroid is isolated by filtration, and the water-washed and dried residue weighs 700 mg. and consists of 9β,11β-oxido-4-pregnene-3,20 dione. Crystallization from acetone-hexane gives material, the infrared spectrum (in Nujol) of which matches the infrared spectrum of an authentic sample.

EXAMPLE 10

*9α-bromo-1,4-androstadiene-11β-ol-3,17-dione-11β-trifluoroacetate*

The requisite intermediate, 1,4,9(11)-androstatriene-3,17-dione, is prepared as follows:

A solution of 11β-hydroxy-1,4-androstadiene-3,17-dione (935 mg.) in dimethylformamide (11 ml.) and pyridine (1 ml.) is cooled to 0° C., and methane sulphonyl chloride (0.784 g.) is added dropwise, with stirring. Stirring at room temperature is continued for 27 hours, and the reaction mixture is then diluted with water, extracted with methylene chloride and the extracts washed with sodium bicarbonate solution and water. Evaporation of the dried (MgSO₄) extracts in vacuo yielded the crude product (770 mg., 88%).

After filtration through Florisil in ether, 640 mg. of the desired product is obtained. Crystallization from acetone-hexane yields 480 mg. of analytically pure triene, M.P. 164–167°, $$\lambda_{max}^{MeOH}\ 238\ m\mu\ (\epsilon\ 15,200)$$

To a stirred solution of the 1,4,9(11)-androstatriene (1.0 g.) in tetrahydrofuran (20 ml.) and trifluoracetic acid (20 ml.) is added N-bromoacetamide (530 mg.), the temperature being kept at about 25° C. by cooling. Stirring is continued, at room temperature, for 3 hours, and the reaction mixture is then poured into water (400 ml.) and filtered. The residue is washed with water, and dried, to yield 9α-bromo-1,4-androstadiene-11β-ol-3, 17-dione-11β-trifluoracetate 1.60 g., showing $$\lambda_{max}^{MeOH}\ 240\ m\mu\ (\epsilon\ 14{,}500)$$

EXAMPLE 11

*Conversion of 9α-bromo-1,4-androstadiene-11β-ol-3,17-dione-11β-trifluoracetate to 9β,11β-oxido-1,4-androstadiene-3,17-dione*

The 11β-trifluoracetate from Example 10 (1.0 g.) in methanol (60 ml.) is treated with N-aqueous sodium hydroxide solution (4.2 ml.) at room temperature, with stirring. The stirred solution is left at room temperature for 8 hours, and the mixture is then poured into water (1 liter). The steroid is isolated by filtration, and the residue is washed with water and dried to yield 572 mg. (91%) of 9β,11β-oxido-1,4-androstadiene-3,17-dione. Purification is effected by crystallization from acetone-hexane, M.P. 164–165°, $$\lambda_{max}^{MeOH}\ 248\ m\mu\ (\epsilon\ 15{,}800).$$

EXAMPLE 12

*Preparation of 9α-bromo-4-androstene-11β-ol-3,17-dione-11β-trifluoracetate*

To a stirred solution of 4,9(11)-androstadiene-3,17-dione (1 g.) in tetrahydrofuran (30 ml.) and trifluoracetic acid (30 ml.) is added N-bromoacetamide (530 mg.), the temperature being maintained at about 25° by cooling. Stirring at room temperature is continued for 3 hours, and the reaction mixture is poured into water (500 ml.) and filtered. The residue is washed with water and dried, yielding 9α-bromo-4-androstene-11β-ol-3,17-dione-11β-trifluoracetate (1.57 g.).

EXAMPLE 13

*Conversion of 9α-bromo-4-androstene-11β-ol-3,17-dione-11β-trifluoracetate to 9β,11β-oxido-4-androstene-3,17-dione*

To the 11β-trifluoracetate from Example 12 (500 mg.) in methanol (40 ml.) is added aqueous N-sodium hydroxide solution (2.1 ml.) at room temperature with stirring. The stirred mixture is left at room temperature for 8 hours, and is then poured into water (500 ml.) and filtered. The residue is washed with water and dried to give 560 mg. (90%) of 9β,11β-oxido-4-androstane-3,17-dione. Purification is effected by crystallization from acetone-hexane, M.P. 180°, identical with authentic material as determined by mixed melting point and comparison of infrared spectra.

EXAMPLE 14

*9α-iodo-1,4-pregnadiene-11β,17α,21-triol-3,20-dione-11β,21-diacetate*

To a stirred solution of 1,4,9(11)-pregnatriene-17α,21-diol-3,20-dione-21-acetate (5.0 g.) and lithium acetate (20 g.) in glacial acetic acid (200 ml.) is added N-iodosuccinimide (3.3 g.). Stirring is continued at room temperature for 17 hours, and the reaction mixture is then poured into water (1000 ml.). The resulting mixture is filtered, and the residue is washed with water and dried to give a quantitative yield of crude product. Crystallization from ethyl acetate gives pure 9α-iodo-1,4-pregnadiene-11β,17α,21-triol-3,20-dione-11β,21 - diacetate, M.P. 145–150° dec., [α]_D+165° (dioxane), $$\lambda_{max}^{MeOH}\ 241\ m\mu\ (\epsilon\ 11{,}00)$$

*Analysis.*—Calcd. for $C_{25}H_{31}O_7I$: C, 52.64; H, 5.48; I, 22.25. Found: C, 52.52; H, 5.30; I, 23.88.

EXAMPLE 15

*9α-bromo-1,4-pregnadiene-11β,17α,21-triol-3,20-dione-11β,21-diacetate*

To a solution of 1,4,9(11)-pregnatriene-17α,21-diol-3,20-dione 21-acetate (1.0 g.) in glacial acetic acid (40 ml.) containing lithium acetate (4 g.) is added N-bromoacetamide (395 mg.), and the mixture is stirred at room temperature for 3 hours. The mixture is then poured into water (400 ml.), filtered, and the residue is washed with water and dried, giving the crude product (1.5 g.; 95%). Crystallization from acetone-hexane furnishes pure 9α - bromo-1,4-pregnadiene-11β,17α,21-triol-3,20-dione-11β,21 diacetate, M.P. 208–210° dec., [α]_D+159° (dioxane), $$\lambda_{max}^{MeOH}\ 240\ m\mu\ (\epsilon\ 14{,}000)$$

*Analysis.*—Calcd. for $C_{25}H_{31}O_7Br$: C, 57.36; H, 5.97; Br, 15.27. Found: C, 57.38; H, 6.03; Br, 15.96.

EXAMPLE 16

*9α-chloro-1,4-pregnadiene-11β,17α,21-triol 3,20-dione-11β,21-diacetate*

To a stirred solution of 1,4,9(11)-pregnatriene-17α,21-diol-3,20-dione 21-acetate (1.0 g.) in glacial acetic acid (40 ml.) containing lithium acetate (4 g.) is added N-chlorosuccinimide (382 mg.) and a solution of hydrogen chloride (104 mg.) in tetrahydrofuran (2.5 ml.). Stirring is continued at room temperature for 2 hours, and the reaction mixture is then poured into water (400 ml.) and filtered. The residue is washed with water and dried to give 1.05 g. (85%) of crude product. Crystallization from acetone-hexane gives 9α-chloro-1,4-pregnadiene-11β,17α,21-triol-3,20-dione-11β,21-diacetate, M.P. 278–281° dec., [α]_D+163° (dioxane), $$\lambda_{max}^{MeOH}\ 236\ m\mu\ (\epsilon\ 15{,}600)$$

*Analysis.*—Calcd. for $C_{25}H_{31}O_7Cl$: C, 62.69; H, 6.52; Cl, 7.40. Found: C, 62.66; H, 6.60; Cl, 7.01.

EXAMPLE 17

*9α-bromo-16α-methyl-1,4-pregnadiene-11β,17α,21-triol-3,20-dione-11β-trifluoracetate 21-acetate*

A solution of 16α - methyl - 1,4,9(11) - pregnatriene-17α,21-diol-3,20-dione 21-acetate (1.0 g.) in tetrahydrofuran (40 ml.) and trifluoracetic acid (40 ml.) is cooled to 5°, and N-bromoacetamide (381 mg.) is added. The reaction mixture is allowed to attain room temperature and left, with shaking, at room temperature for 4 hours. The reaction mixture is then treated with water, filtered, and the residue is washed with water and dried to give the crude product in quantitative yield. Crystallization from acetone-hexane gives the compound of this example $$\lambda_{max}^{MeOH}\ 241\ m\mu\ (\epsilon\ 14{,}300).$$

EXAMPLE 18

*9α-bromo-16β-methyl-1,4-pregnadiene-11β,17α,21-triol-3,20-dione-11β-trifluoracetate 21-acetate*

A solution of 16β - methyl - 1,4,9(11) - pregnatriene-17α,21-diol-3,20-dione 21-acetate (1.0 g.) in tetrahydrofuran (40 ml.) and trifluoracetic acid (40 ml.) is treated with N-bromoacetamide (381 mg.) in the manner of the preceding example to give the compounds of this example.

EXAMPLE 19

*9α-bromo-17α-methyl-4-androstene-11β,17β-diol-3-one-11β-acetate*

To a stirred solution of one gram of 17α-methyl-4,9(11)-androstadiene-17β-ol-3-one in glacial acetic acid (40 ml.) containing lithium acetate (4 g.) is added N-bromoacetamide (471 mg.) and the mixture is stirred at room temperature for 17 hours. The reaction mixture is then poured into water (400 ml.), filtered, and the residue is washed with water and dried to give the crude product.

Crystallization from acetone-hexane gives 9α-bromo-17α-methyl-4-androstene-11β,17β-diol-3-one-11β acetate.

EXAMPLE 20

*Conversion of 9α-bromo-17α-methyl-4-androstene-11β, 17β-diol-3-one-11β-acetate to 9β,11β-oxido-17α-methyl-4-androstene 17β-ol-3-one*

To the compound of the preceding example (500 mg.) in methanol (20 ml.) is added aqueous 2 N-sodium hydroxide solution (2.6 ml.) and the resulting solution is refluxed for 17 hours. The reaction mixture is then cooled, neutralized with acetic acid, poured into water and filtered. The residue is washed with water and dried, to give 9β,11β-oxido-17α-methyl-4-androstene-17β-ol-3-one.

EXAMPLE 21

*9α-bromo-1,4-pregnadiene-11β,17α,21-triol-3,20-dione-11β-acetate*

One gram of 9α-bromo-1,4-pregnadiene-11β,17α,21-triol-3,20-dione-11β,21-diacetate (from Example 15) is suspended in 0.27 N methanolic perchloric acid (60 ml.) and the suspension is stirred at room temperature for 17 hours. Water (400 ml.) is added and the resulting mixture is filtered. The residue is washed with water and dried to give crude product. Crystallization from acetone-hexane yields the compound of this example as a crystalline solid.

EXAMPLE 22

*17,20; 20,21-bismethylenedioxy derivative of 9α-bromo-1,4 - pregnadiene - 11β,17α,21 - triol - 3,20 - dione - 11β-acetate*

The compound of the preceding example (500 mg.) is dissolved in chloroform (20 ml.) and formaldehyde (5 ml., 37%) and concentrated hydrochloric acid (5 ml.) are added. The resulting mixture is stirred vigorously at room temperature for 48 hours, and is then evaporated in vacuo to low volume. Water is then added, and the mixture is filtered. The residue is washed with water, dried and crystallized from acetone-hexane to give the compound of this example.

EXAMPLE 23

*Conversion of the bismethylenedioxy derivative of 9α-bromo-1,4-pregnadiene-11β,17α,21 - triol - 3,20 - dione-11β-acetate to 9β,11β-oxido-1,4 - pregnadiene - 17α,21-diol-3,20-dione*

(A) The compound of the preceding example (1.0 g.) is dissolved in ethanol (40 ml.) and 2 N-aqueous sodium hydroxide solution (5 ml.) is added. The resulting solution is refluxed for 17 hours, and is then cooled and neutralized with acetic acid. Evaporation in vacuo to low volume and filtration gives crude product which consists substantially of the bismethylenedioxy derivative of 9β,11β-oxido-1,4-pregnadiene-17α,21-diol-3,20-dione.

(B) The above crude product is dissolved in 60% aqueous formic acid (50 ml.) and the resulting solution is left at room temperature for three days. Water precipitation, filtration and drying of the residue gives a crude product which consists substantially of 9β,11β-oxido-1,4-pregnadiene-17α,21-diol-3,20-dione.

I claim:

1. In the process of preparing 9β,11β-epoxides of the pregnane and androstane series, the step of converting a 9α-bromo-11β-lower alkanoyloxy steroid into the corresponding 9β,11β-oxido compound by reacting the former with a member of the group consisting of alkali metal hydroxides and alkali metal lower alkanoates.

2. The process for preparing 9β,11β-epoxides of the pregnane series which comprises subjecting a 9α-bromo-11β-lower alkanoyloxy pregnane of the series to the action of a member of the group consisting of alkali metal hydroxides and alkali metal lower alkanoates.

3. In the process for preparing 9β,11β-epoxides of the pregnane series, the step which comprises reacting a 9α-bromo-11β-R-steroid of the pregnane series, wherein R is a member of the group consisting of formoxy and polyhaloacetoxy with a member of the group consisting of alkali metal hydroxides and alkali metal lower alkanoates.

4. In the process of preparing a 9β,11β-oxido compound of the pregnane series, the step of converting a 9α-bromo-11β-hydroxy steroid of the series, said steroid having an 11-ester selected from the group consisting of formate and halogenated lower alkanoate, which comprises treating the 9α-bromo-11-ester with a member of the group consisting of alkali metal hydroxides and alkali metal lower alkanoates.

5. The process of claim 4, wherein the reaction is carried out in an essentially organic solvent.

6. The process of claim 4, wherein the reaction is carried out in a lower fatty alcohol.

7. The process for preparing a 9β,11β-oxido compound of the pregnane series which comprises reacting a 9α-bromo-11β-acyloxy compound of the series with a dilute alkali metal hydroxide in a solvent comprised of essentially a lower fatty alcohol, said 11β-acyloxy taken from the group consisting of formoxy and trifluoroacetoxy.

8. The process of claim 7, wherein the pregnane reactant possesses at least a Δ⁴-unsaturation and a 3,20-diketo substituent.

9. The process which comprises reacting a compound of the group consisting of 11β-formates and 11β-trifluoroacetates of 9α-bromo-Δ⁴-pregnene-17α,21-diol-3,20-diones with an alkali metal hydroxide in essentially alcoholic solution whereby there is formed the corresponding 9β,11β-oxido compound.

10. The process which comprises reacting a compound of the group consisting of 11β-formates and 11β-trifluoroacetates of 9α-bromo-1,4-pregnadiene-17α,21 - diol - 3,20-dione with an alkali metal hydroxide in essentially alcoholic solution whereby there is formed the corresponding 9β,11β-oxido compound.

References Cited in the file of this patent

UNITED STATES PATENTS

| | | |
|---|---|---|
| 2,763,671 | Fried et al. | Sept. 18, 1956 |
| 2,793,218 | Herr | May 21, 1957 |
| 2,852,511 | Fried | Sept. 16, 1958 |